Figure 4:
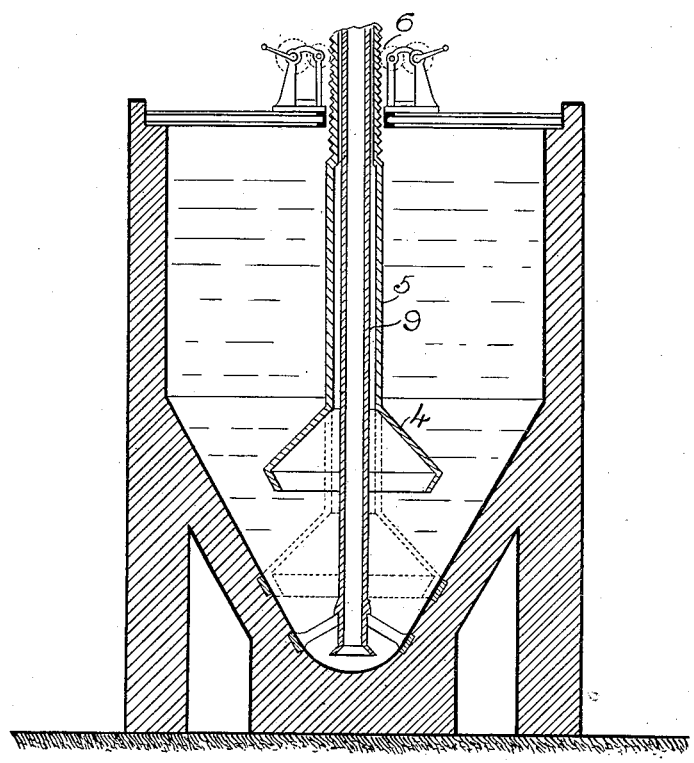

B. KAIBEL.
APPARATUS FOR SEPARATING DEPOSITED MATTER FROM LIQUIDS.
APPLICATION FILED MAY 4, 1912.
1,077,476.
Patented Nov. 4, 1913.
2 SHEETS—SHEET 1.
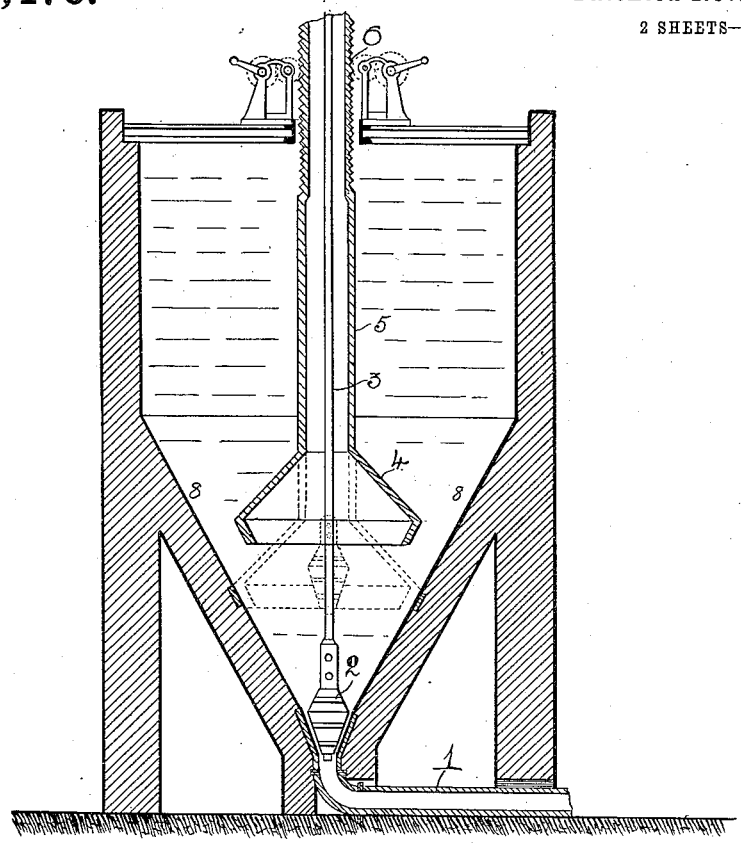
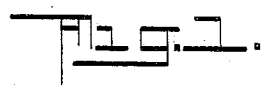
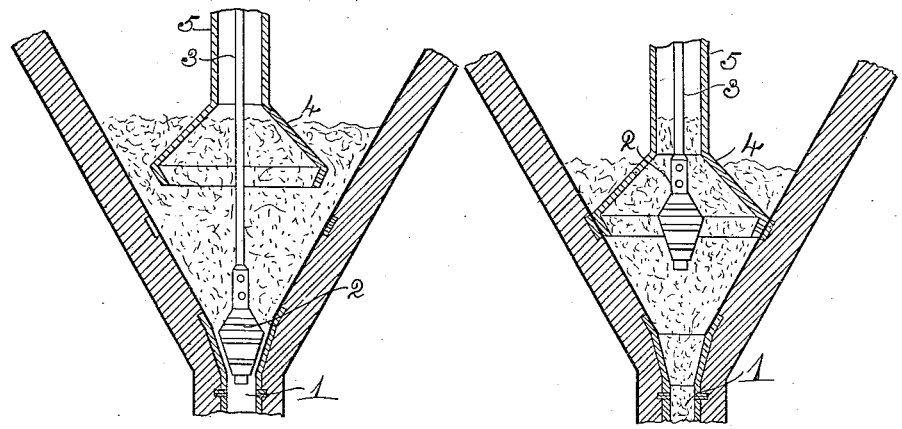

B. KAIBEL.
APPARATUS FOR SEPARATING DEPOSITED MATTER FROM LIQUIDS.
APPLICATION FILED MAY 4, 1912.

1,077,476.

Patented Nov. 4, 1913.

2 SHEETS—SHEET 2.

UNITED STATES PATENT OFFICE.

BURKHARDT KAIBEL, OF DARMSTADT, GERMANY.

APPARATUS FOR SEPARATING DEPOSITED MATTER FROM LIQUIDS.

1,077,476.     Specification of Letters Patent.     Patented Nov. 4, 1913.

Application filed May 4, 1912. Serial No. 695,300.

*To all whom it may concern:*

Be it known that I, BURKHARDT KAIBEL, a subject of the German Emperor, residing at 69 Heidelbergerstrasse, Darmstadt, in the Empire of Germany, have invented certain new and useful Improvements Relating to Apparatus for Separating Deposited Matter from Liquids, of which the following is a specification.

The object of the present invention is a new outlet arrangement for precipitates and deposits which have settled from liquids and more especially for the separation and removal of the sludge or suspended matter, which has sunk to the bottom in the treatment of canal water and the like by any mechanical clearing apparatus (sedimentation basin or well). The invention will be described with reference to the separation of sludge, but it is to be understood that it can also be employed for the separation of various precipitates from liquids and in fact to replace the operation of decantation in chemical work by a more accurate process of separation.

According to the present invention as compared with previous methods it is possible to obtain more successfully the heavy precipitated sludge particles in as convenient and reliable a manner as possible, and more particularly poorer in water than hitherto, such sludge being led away from above or from below without either emptying the apparatus or even disturbing its contents, and consequently stirring up the deposited sludge. This object is attained by cutting off the mud particles as completely as possible from the remainder of the vessel, while allowing the access of air so that the whole clearing process takes place in a smooth manner. The sludge is as far as possible hermetically sealed off from the body of the apparatus, with the exception of a steady supply of air which is isolated from the clearing space. By this means the outflow of the sludge is effected by gravity or mechanical suction, and takes place through a valve which is only opened after the sludge has been cut off from the body of the liquid. This coöperation of a cutting off device such as a bell and a valve at the bottom has not been employed in previous apparatus.

Two forms of the apparatus are shown in Figs. 1 and 4 of the accompanying drawings in which the sludge is removed from below and from above respectively. Figs. 2 and 3 are different positions of the apparatus of Fig. 1.

The suspended matter first separated according to any system in the upper clearing space of a settling well slowly falls to the bottom and finally collects in the lower spherical, funnel shaped (either conical or pyramidal) extremity of the well, right at the bottom of which is connected the sludge outlet pipe 1 in Fig. 1. The sludge outlet pipe 1 is normally closed by a valve 2 (conical stopper) as shown in Fig. 2, but this can be opened by raising the rod 3 and closed again by lowering the same. A bell 4 is provided which is connected to an open wide hollow tube 5. The bell can be raised and lowered by this tube through a crank and the teeth 6. This bell is for the purpose of allowing the slude to run out alone and preventing the whole contents of the clearing vessel together with the particles of sludge suspended therein from being stirred up. The two positions of the bell are shown by continuous and dotted lines respectively. At the upper position of the bell 4 the valve 2 is closed and the sludge slowly and steadily falls downward through the water and collects to about the height of the horizontal 8—8. The removal of the sludge now begins. The bell 4 is lowered until it presses firmly and absolutely tightly against a turned metal ring inserted in the wall of the extremity of the vessel (see the dotted position of the bell). The sludge in and below it is compressed and hermetically cut off from the rest of the vessel and from the water therein. It is only when this has been done that the stopper 2 on the rod 3 is raised (see dotted lines). The apparatus is now as shown in Fig. 3. Air passes in from above through the pipe 5 and the sludge is removed through the pipe 1 either by its own weight or mechanical suction. This sludge is in the desired condition of freedom from water. Then the stopper 2 is again tightly inserted, after which the bell 4 is again raised. In extensive clearing basins the above described clearing cones or the like with stopper and bell can be repeated at will and placed together in any desired manner.

In the form shown in Fig. 4 the bottom of the clearing cone is sealed so that the stopper 2 can be dispensed with. Inside the pipe 5 attached to the bell a suction pipe 9 is provided which does not reach quite to the bottom of the clearing cone through which the sludge separated from the clearing space as described in Fig. 1 and poor in water is sucked off from above by a pump or by a vacuum.

What I claim as new and desire to secure by Letters Patent is:—

1. In an apparatus for separating deposited matter from liquids, the combination of a funnel-shaped well the lower part of which adjacent to and above the apex is adapted to serve as a settling space for the sludge, a bell having means of communication with the external air, and adapted to serve as a valve, a valve seat for same at the upper portion of said settling space, and means for withdrawing the deposited matter directly from said settling space.

2. In an apparatus for separating deposited matter from liquids the combination of a well having its walls continued downwardly to form a funnel-shaped settling space, a valve seat at the upper part of said settling space, a bell adapted to seat on said valve seat, and having means of communication with the outer air, and means for withdrawing the deposited contents from said settling space.

3. Apparatus for separating deposited matter from liquids, comprising in combination a downwardly funnel-shaped well, a ring or valve seat in said well above the apex thereof, the space between said ring or valve seat serving as a settling space for the sludge, a bell adapted to seat on said ring, a pipe or tube connecting said bell with the outer air, means for raising and lowering said bell by said tube or pipe, and means for removing the sludge from said settling space.

4. An apparatus for separating sludge from water comprising a clearing well whose lower extremity is cone-shaped and whose wall contains a turned metal ring, a bell adapted to seal with said ring, the said bell being open below and connected with an open tube above, said open tube communicating with the air, means to raise and lower said bell by said open tube, a stopper adapted to fit within an aperture at the lowest point of the cone, a rod attached to said stopper passing through the bell and the open tube and a pipe attached to the outlet through which the sludge flows away after depression of the bell and elevation of the stopper.

5. An apparatus for separating sludge from water comprising a clearing well whose lower extremity is cone-shaped, and whose wall contains at a distance above the apex of the cone a turned metal ring, a bell adapted to seal with said ring, the said bell being open below and connected with an open tube above, said open tube communicating with the air, means to raise and lower said bell by said open tube, means for withdrawing the contents of said cone-shaped lower extremity between said turned metal ring and the apex.

In testimony whereof, I affix my signature in presence of two witnesses.

BURKHARDT KAIBEL.

Witnesses:
 AUGUST BRÜCK,
 FRITZ ROST.

---

Copies of this patent may be obtained for five cents each, by addressing the "Commissioner of Patents, Washington, D. C."